US005518032A

United States Patent [19]

Berke

[11] Patent Number: 5,518,032

[45] Date of Patent: May 21, 1996

[54] PRESSURE VESSEL SAFETY RELIEF

[76] Inventor: Lanny R. Berke, 4470 Forestview La., Plymouth, Minn. 55442

[21] Appl. No.: 463,758

[22] Filed: Jun. 5, 1995

[51] Int. Cl.[6] .......... A01G 25/09

[52] U.S. Cl. .......... 137/899.4; 137/67; 137/559; 137/797

[58] Field of Search .......... 137/899.4, 557, 137/559, 67, 797

[56] References Cited

U.S. PATENT DOCUMENTS

| | | | |
|---|---|---|---|
| 2,204,816 | 6/1940 | Niederreither | 137/67 |
| 2,804,259 | 8/1957 | Ralston | 137/899.4 |
| 2,826,354 | 3/1958 | Field | 137/899.4 |
| 2,918,941 | 12/1959 | Whiting | 137/67 |
| 3,504,687 | 4/1970 | Dunston | 137/67 |
| 4,232,513 | 11/1980 | Pearson et al. | 137/797 |

*Primary Examiner*—A. Michael Chambers
*Attorney, Agent, or Firm*—James D. Christoff

[57] ABSTRACT

A pressure vessel safety relief includes one or more recesses on a bottom wall section of the vessel. The thickness of the bottom wall section in areas directly over each recess is less than the thickness of remaining areas of the bottom wall section. Once the bottom wall section has corroded to a significant degree, the wall section ruptures in areas over the recesses to safely relieve pressure within the vessel. Preferably, the recess decreases in cross-sectional area as the top of the recess is approached, such that the escaping air emits a high-pitched whistling noise that functions as an alarm to notify the user that the vessel is corroded and should be replaced.

11 Claims, 1 Drawing Sheet

PRESSURE VESSEL SAFETY RELIEF

BACKGROUND OF INVENTION

1. Field of the Invention

This invention concerns a safety relief for relieving the pressure of a gas within a pressure vessel such as an air compressor tank, a pressure tank used in manufacturing or a storage tank used to hold a quantity of gas under pressure.

2. Description of the Related Art

Pressure vessels are used in a wide variety of commercial, industrial and residential applications. For example, pressure vessels are often an important element in power and manufacturing plants. In such settings, pressure vessels provide a structural container for many possible functions including chemical reactions, treating, mixing and blending, separation, heat exchange and regeneration.

Pressure vessels are also used for the storage of a gas under pressure. Common examples of such vessels include cylindrical, barrel-shaped or drum-shaped containers for acetylene, propane, hydrogen, oxygen and carbon dioxide. Typically, gas storage vessels have wall sections that are relatively thick to withstand considerable pressure so that a relatively large amount of gas can be retained within the vessel. Gas storage pressure vessels are useful in many industrial, commercial, farming and residential applications.

Another well-known example of a pressure vessel includes the tank commonly used in connection with air compressors. The tank provides a reservoir for the temporary storage of compressed air so that the air compressor need not operate every time that a relatively small amount of air is withdrawn from the tank. The tank extends the useful life of the air compressor by reducing the number of times that the air compressor would otherwise be energized during intermittent withdrawal of pressurized air over a period of time.

Unfortunately, the energy stored in pressurized gases contained in pressure vessels represents a potential hazard that in certain circumstances can cause serious bodily harm and even death. If, for example, the vessel was manufactured with a welded seam that was relatively weak, the seam might rupture during use, and the force of the escaping gas might cause a fragment of the vessel to injure the operator or a bystander. Moreover, if the stored gas is flammable, the gas could ignite and cause a fire or explosion.

As a consequence, manufacturers of pressure vessels have devoted considerable attention over the years to the construction of vessels that are intended to safely contain gases under certain, pre-designated pressures. In addition, many states and cities of the United States and certain provinces and territories of Canada have adopted all or part of the A.S.M.E. Boiler and Pressure Vessel Code as a legal basis for pressure vessel construction. The A.S.M.E. Boiler and Pressure Vessel Code sets out certain minimum, essential construction requirements for pressure vessels in an effort to ensure that such vessels do not rupture when properly used as intended and correctly maintained.

Pressure relief valves are often used with certain vessels to keep pressure within the vessel below a certain specified limit. As an example, some tanks used in industrial processes to enclose and contain a chemical reaction are provided with a valve that opens to relieve pressure within the tank if the pressure exceeds the specified amount. The relief valve is useful for keeping pressure within the tank below the amount that is considered the maximum for safe operation as may be determined by the manufacturer of the tank.

However, some pressure vessels such as those made of steel may weaken after an extended period of time due to corrosion on an inner surface of the vessel wall. The corrosion may eventually weaken the wall to such an extent that the wall eventually ruptures when the vessel is in use. Such internal corrosion is especially hazardous because the visible, outer surface of the wall may appear relatively unblemished and lead the user to believe that the vessel is in satisfactory condition. As a result, the wall may rupture even though the pressure within the vessel is below the maximum rated pressure of the vessel as was originally determined by the vessel manufacturer.

It is known, for example, that the internal walls of air compressor tanks can corrode due to water vapor that condenses from compressed air in the tanks. Many manufacturers of air compressors attempt to avoid problems of internal corrosion by including a drain valve near the bottom of the tank. Instructions provided with the air compressor direct the user to open the drain valve after each use in order to drain condensed moisture from the tank.

However, the drain valves provided on air compressor tanks have not completely avoided the problems caused by moisture condensing within the tanks, and serious injuries due to rupturing walls of corroded tanks have still been reported. In some instances, the user may not read or fully comprehend the manufacturer's instructions to open the drain valve after each use. In other instances, the user may simply forget to open the drain valve. Many air compressor systems intended for household use maintain pressures of up to 125 p.s.i. or more, which is sufficient to cause significant injury if the tank were to unintentionally rupture.

There is clearly a need in the art to solve the problem of providing a safe pressure vessel in order to avoid personal injury and property damage that might otherwise occur due to internal corrosion of the vessel. Preferably, such a solution should be relatively inexpensive, adaptable to a variety of different vessels and yet require little, if any, attention from the user.

SUMMARY OF THE INVENTION

My present invention is directed toward a pressure vessel that includes a tank having wall sections defining a chamber. The wall sections include a bottom wall section having a certain average wall thickness. The bottom wall section also has at least one recess, and each recess presents a relief area in the bottom wall section that has a thickness less than the average wall thickness of the bottom wall section.

The relief area is located in the bottom wall section because moisture condensing within the chamber normally descends to the inner surface of the bottom wall section. The relief area provides a defined area of weakness in the tank wall sections that will rupture once corrosion in the bottom wall section in locations next to the relief area has advanced to such a degree that the relief area can no longer withstand the pressure of gas within the tank. Once opened, the relief area provides a vent to safely discharge the contained gas to the atmosphere and hinder further use of the tank.

In preferred embodiments of the invention, the recess extends upwardly from the outer surface of the lowermost portion of the bottom wall section, and narrows in cross-sectional area as the inner surface of the bottom wall section is approached. As one example, the recess has a shape similar to an inverted cone. Once corrosion inside the tank has progressed sufficiently to a degree to enable gas to escape through the recess, the relatively narrow cross-sectional area at the top of the recess functions as a whistle to signal the user that the tank is leaking and should be replaced.

These and other aspects of the invention are further described in the detailed description that follows as well as in the accompanying drawings.

DETAILED DESCRIPTION OF THE PREFERRED EMBODIMENTS

Figure 1:
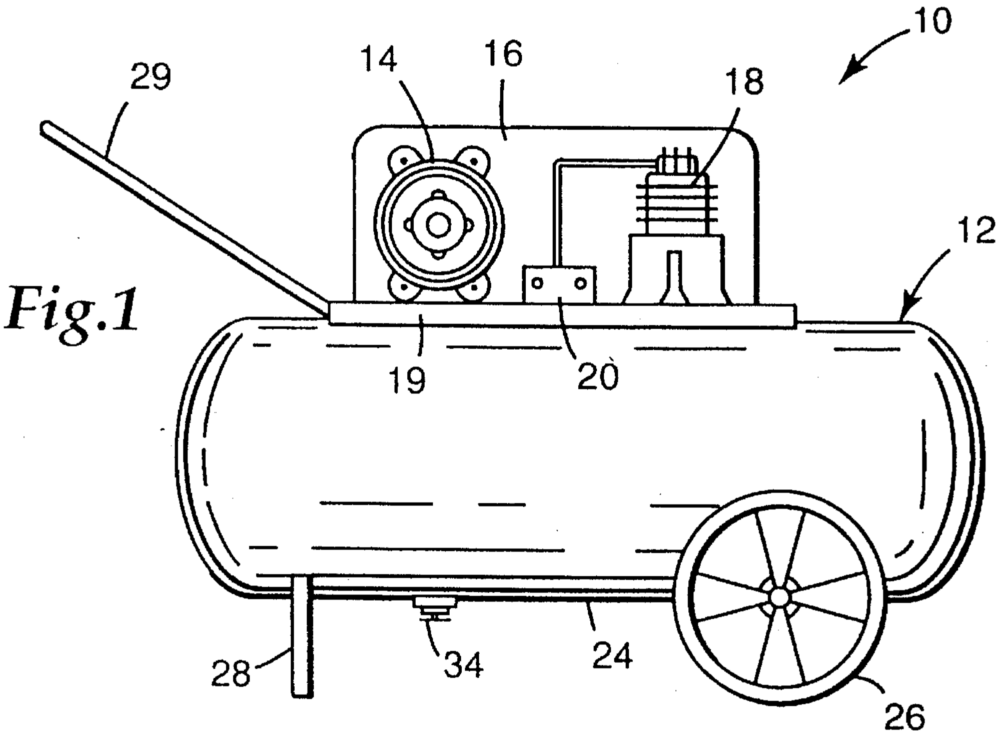
FIG. 1 is a side elevational view of an exemplary pressure vessel constructed in accordance with one embodiment of my invention, wherein the pressure vessel in this instance includes an air compressor tank.
Figure 2:
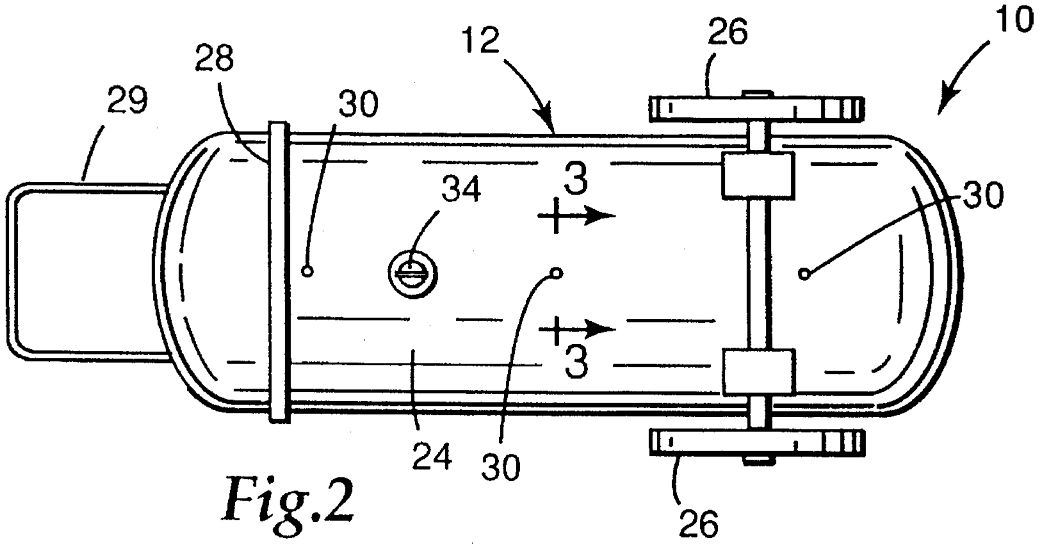
FIG. 2 is a bottom view of the pressure vessel shown in FIG. 1 which includes, for purposes of explanation and illustration, three recesses each providing a pressure relief area according to the invention.
Figure 3:
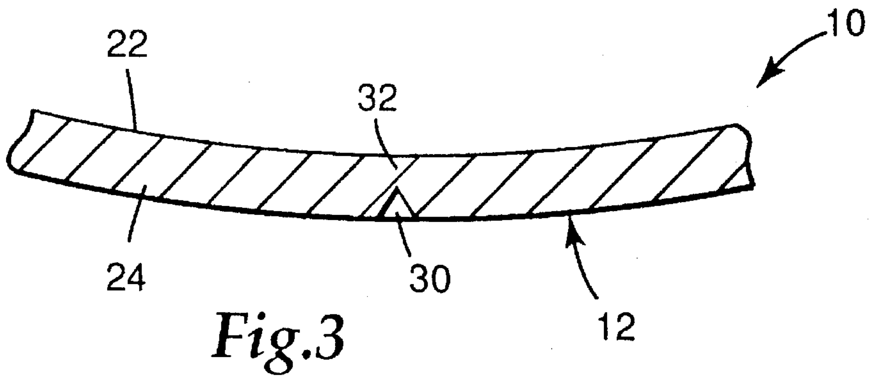
FIG. 3 is an enlarged, fragmentary cross-sectional view taken along lines 3—3 of FIG. 2 and showing one of the pressure relief areas that is constructed in a bottom wall section of the tank.

A pressure vessel 10 according to one embodiment of the invention is shown in FIGS. 1–3 and comprises in this instance an air compressor system having a tank 12. The air compressor system also includes an electric motor 14 (see FIG. 1) that is connected by a covered belt drive 16 to a compressor 18 (the belt and the pulleys of the belt drive 16 are not shown). The compressor 18 is coupled by tubing to the tank 12. The motor 14 and the compressor 18 are supported by a platform 19 that is secured to the top of the tank 12.

The air compressor system has a control mechanism 20 that is similar to control mechanisms well known in the art. The control mechanism 20 senses pressure in the tank 12, and initiates operation of the electric motor 14 whenever the pressure of compressed air in the tank 12 falls below a pre-selected minimum value. When the electric motor 14 is energized, the motor 14 drives the belt drive 16 which, in turn, drives the compressor 18 to direct pressurized air into the tank 12. The control mechanism 20 interrupts operation of the electric motor 14 once the pressure of compressed air in the tank 12 rises above a certain value.

The tank 12 has wall sections defining an enclosed, generally cylindrical chamber 22 (see FIG. 3). The wall sections include a bottom wall section 24, two side wall sections, a top wall section and two circular end wall sections. As one option, the tank 12 is made by rolling a sheet of steel into a cylindrical shape and welding along the seam to form the bottom wall section 24, the side wall sections and the top wall section. The end wall sections are then welded to the cylindrical shape of the other wall sections.

At least one support is connected to the tank 12 for supporting the tank 12 in an orientation wherein the bottom wall section 24 faces downwardly and extends across the bottom of the chamber 22 In the embodiment shown in the drawings, two supports in the nature of wheels 26 are connected to the side wall sections of the tank 12 near one of the end wall sections. In addition, a support in the nature of a stationary leg 28 spans the bottom of the tank 12 and is fixed to both of the side wall sections of the tank 12 near the other end wall section.

The air compressor system also has a handle 29 (FIG. 1) that is coupled to the platform 19. The handle 29 and the wheels 26 enable the air compressor system to be moved about as needed. However, once the system is moved to a desired location, the wheels 26 and the leg 28 support the tank 12 in a certain, consistent, horizontally-extending orientation wherein the bottom wall section 24 faces downwardly and extends across the bottom of the chamber 22.

As illustrated in FIGS. 2 and 3, the bottom wall section 24 includes three recesses 30 that extend upwardly from the outer, lowermost surface of the bottom wall section 24, although a fewer or greater number of recesses is also possible and within the scope of the invention. Preferably, each recess 30 has a horizontal cross-sectional area that decreases as the chamber 22 is approached. In the embodiment shown, each recess 30 has the shape of an inverted, truncated cone that terminates in an uppermost, pointed tip.

In many air compressor systems, the thickness of the tank wall is about 0.070 to 0.080 inch thick. A suitable recess may be constructed in such a tank wall by using a conventional metal drill bit having a diameter of about 0.035 to 0.040 inch, and drilling into the tank wall a distance equal to about one-half the thickness of the tank wall. The pointed end of such drill bits provides a suitable conical shape for the recess.

Each recess 30 presents an overlying relief area 32 in the bottom wall section 24. The thickness of the bottom wall section 24 in the relief areas 32 above the corresponding recess 30 is less than the average thickness of remaining areas of the bottom wall section 24. As an example according to the construction set out in the preceding paragraph, the thickness of the bottom wall section 24 in the relief area 32 is about one-half of the average thickness of remaining areas of the bottom wall section 24.

Finally, a drain valve 34 is provided in the bottom wall section 24 near one of the end wall sections. Once use of the air compressor system has been completed, the drain valve 34 is opened to drain any water from the chamber 22 that may have condensed out of the compressed air and collected in the tank 12.

Each pressure relief area 32 provides a weakened portion of the bottom wall section 24 that ruptures once significant corrosion has occurred on the inner surface of the bottom wall section 24. Corrosion may occur, for example, by the failure of the user to open the drain valve 34 and drain the condensate after each use of the air compressor system. As corrosion accumulates along the inner, upper surface of the bottom wall section 24 including the portions within the pressure relief areas 32, the strength of the bottom wall section 24 is gradually reduced until such time as the bottom wall section 24 is sufficiently weak to rupture within one or more of the relief areas 32 under pressures reached within the tank 12 during normal operating conditions.

Once one or more of the relief areas 32 is ruptured, pressurized air within the tank 12 is vented to the atmosphere. Advantageously, as the pressurized air escapes through the narrowed, pointed upper end portion of the recess 30 below the ruptured relief area 32, the fast-moving air escaping through the relatively small opening creates a high-pitched whistling sound. The whistling sound functions as an alarm to alert the user that significant corrosion within the tank 12 has occurred and that the tank 12 should now be replaced. Labels are placed on the tank 12 to instruct that user that the recesses 30 next to the ruptured relief area 32 should not be plugged, so that the relief areas 32 function as intended.

The relief areas 32 are located along the bottom of the inner surface of the bottom wall section 24 where the most severe effects of corrosion are expected to occur. As shown in FIG. 2, one recess 30 (and thus one relief area 32) is located at the center of the bottom wall section 24 in a direction lengthwise of the tank 12, while the other recesses 30 (along with their respective relief areas 32) are placed along the longitudinal bottom axis at a location that is nearer to the corresponding end wall section than the distance to the center recess 30. Other locations are possible as well.

It can be appreciated by those skilled in the art that many modifications and additions to the embodiment described above in detail can be constructed without departing from the spirit of my invention. For example, the pressure relief areas 32 could have shapes other than the shape of an inverted cone. The pressure relief areas could also be constructed by providing lines of weakness surrounding a circular, rectangular or other defined portion of the bottom wall section 24 that is intended to rupture under pressure and open outwardly as a panel after sufficient corrosion within the tank has occurred.

Moreover, the invention is useful for other types of pressure vessels in addition to the vessel shown in the drawings. For example, the pressure relief areas may be provided on bottom wall sections of tanks used with other types of air compressors systems such as larger air compressor systems having an upright cylindrical tank. Pressure relief areas may also be provided on other pressure vessels such as vessels used for storage of gases or for containing a chemical reaction or process.

Accordingly, the invention should not be deemed limited to the specific examples described in detail above and shown in the drawings, but instead only by a fair scope of the claims that follow along with their equivalents.

I claim:

1. A pressure vessel comprising:

a tank having wall sections defining a chamber, said chamber being constructed to contain a gas under pressure, said wall sections of said tank including a corrodible, outer, bottom wall section having a certain average wall thickness; and at least one support connected to said tank for supporting said tank in an orientation wherein said bottom wall section extends across the bottom of said chamber, wherein said bottom wall section includes at least one recess extending in a direction toward said chamber, and wherein each recess presents a corrodible relief area in said bottom wall section having a thickness that is less than said certain average wall thickness of said bottom wall section, each relief area being rupturable once sufficiently corroded, each recess providing a passageway to vent pressurized gas in said chamber after the corresponding relief area has ruptured.

2. The pressure vessel of claim 1, wherein each recess has a cross-sectional area that decreases as said chamber is approached.

3. The pressure vessel of claim 2, wherein each recess has an inverted conical shape.

4. The pressure vessel of claim 1, wherein each recess includes a narrowed portion with a cross-sectional area that is sufficiently small to provide a whistling sound as pressurized air from the chamber is vented through the recess.

5. The pressure vessel of claim 1, wherein at least one recess is located on a lowermost portion of said bottom wall section.

6. The pressure vessel of claim 1, wherein said bottom wall section has an outer surface, and wherein each recess is located on said outer surface and extends toward said chamber.

7. The pressure vessel of claim 1, wherein said tank has a cylindrical configuration with a central longitudinal axis that extends in a generally horizontal direction.

8. The pressure vessel of claim 1, wherein said tank has a cylindrical configuration with a central longitudinal axis that extends in an upright direction.

9. The pressure vessel of claim 1, including an air compressor and a motor for driving said air compressor.

10. The pressure vessel of claim 1, wherein said at least one support includes at least one leg.

11. The pressure vessel of claim 1, wherein said at least one support includes at least one wheel.

* * * * *